June 23, 1964    W. E. TRAGERT ET AL    3,138,490
FUEL CELL

Original Filed Feb. 28, 1961    2 Sheets-Sheet 1

Inventors:
William E. Tragert,
Robert L. Fullman,
Ralph E. Carter,
by Paul R. Webb, II
Their Attorney.

Inventors:
William E. Tragert,
Robert L. Fullman,
Ralph E. Carter,
by Paul R. Webb, II
Their Attorney.

United States Patent Office 3,138,490
Patented June 23, 1964

3,138,490
FUEL CELL
William E. Tragert, Scotia, Robert L. Fullman, Schenectady, and Ralph E. Carter, Colonie, N.Y., assignors to General Electric Company, a corporation of New York
Continuation of application Ser. No. 92,356, Feb. 28, 1961. This application Sept. 30, 1963, Ser. No. 312,710
13 Claims. (Cl. 136—86)

This invention relates to fuel cells and more particularly to high temperature fuel cells in which the electrolyte is solid and the electrodes are in the liquid state during cell operation.

This application is a continuation of application Serial No. 92,356, filed February 28, 1961, now abandoned, and assigned to the same assignee as the present application. In copending application Serial No. 92,354, filed February 28, 1961, and assigned to the same assignee as the present application, there is disclosed and claimed a fuel cell with a silver cathode, a solid stabilized zirconia electrolyte, and an anode of porous carbonaceous material.

Where electrical energy is generated from the heat of chemical reactions, a fuel is generally oxidized by air and the chemical energy of the fuel is converted into heat and mechanical energy. This heat and mechanical energy is then used in gas turbines or steam turbines connected to conventional dynamoelectric generators to provide the electrical energy needed. It is estimated that the overall efficiency of this conversion is less than 50 percent.

In order to avoid inefficiency in this type of electricity generation, it has been proposed to employ fuel cells to convert the chemical energy of the fuel directly into electrical energy without the conversion of the energy of the fuel into heat and mechanical energy. While carbon fossil fuels would be desirable in fuel cells, they are not readily brought into a form suitable for electrochemical reaction. For example, coal poisons the electrodes of a fuel cell by its chemical impurities. A further problem is the requirement for a suitable electrolyte for the successful operation of such a cell.

High temperature fuel cells would be advantageous to provide a low voltage direct current power source on a continuous basis. Such cells should employ preferably a carbon fuel, exhibit stability and efficiency and be low in cost. These cells would have application in various chemical process industries, such as the manufacture of aluminum and the electro-refining of copper. Furthermore, the operation of direct current motors could be accomplished with these cells. Waste heat can be employed effectively to operate the cells.

It is an object of our invention to provide a high temperature fuel cell which employs a carbon fuel, exhibits stability and efficiency and is low in cost.

It is another object of our invention to provide a fuel cell operable at high temperatures in the range of 1000° C. to 1200° C.

It is another object of our invention to provide a fuel cell which employs electrodes in liquid state during operation.

It is a further object of our invention to provide a high temperature fuel cell which includes a metallic, carbon solvent anode.

It is a still further object of our invention to provide a high temperature fuel cell which employs a solid electrolyte.

In carrying out our invention in one form, a high temperature fuel cell employs a silver electrode, a second electrode selected from the group consisting of iron saturated with carbon and cobalt-tin saturated with carbon, the electrodes characterized by being in liquid state during cell operation at high temperatures, a solid stabilized zirconia electrolyte positioned between and in direct contact with said electrodes, means for supplying a gaseous oxidant to said silver electrode, and means for supplying a carbon fuel to said second electrode.

These and various other objects, features, and advantages of the invention will be better understood from the following description taken in connection with the accompanying drawing in which.

Figure 1:
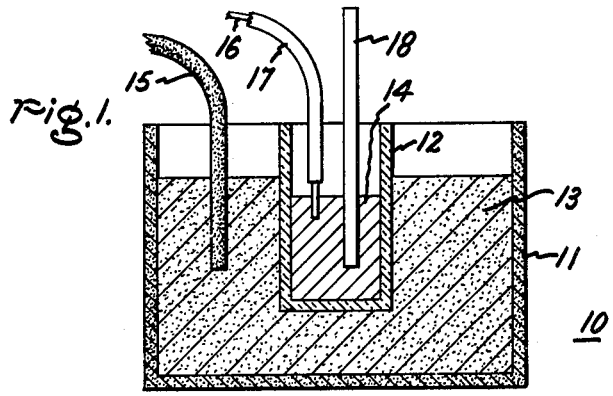
FIGURE 1 is a sectional view of a high temperature fuel cell embodying our invention.

In FIGURE 1, a high temperature fuel cell is shown generally at 10 which comprises a first open container 11, for example, of alumina or carbon in which is positioned a second container 12 of solid stabilized zirconia, the cell electrolyte. A metallic, carbon solvent electrode 13 selected from the group consisting of iron saturated with carbon and cobalt-tin saturated with carbon is positioned in container 11 and is in direct contact with container 12. A silver electrode 14 is positioned in second container 12. A lead 15, such as of carbon, contacts electrode 13 by being inserted therein while a lead 16, such as of stainless steel, contacts electrode 14 in a similar manner. One end of lead 16 is inserted in the silver electrode and the other end is connected to apparatus (not shown) being operated by the cell. Lead 16 can be encased by insulation 17. The free end of lead 15 is connected in a similar manner to the same apparatus to complete the circuit from cell 10. Carbon saturation of anode 13 is maintained by supplying a carbon fuel thereto. Such means are shown by carbon lead 15 which dissolves while providing electrical contact to the anode. Means are provided for supplying a gaseous oxidant in the form of air or oxygen to silver electrode 14. For example, a tube 18 of zirconia, alumina or stainless steel is inserted into electrode 14 and connected to an oxidant supply (not shown).

Figure 2:
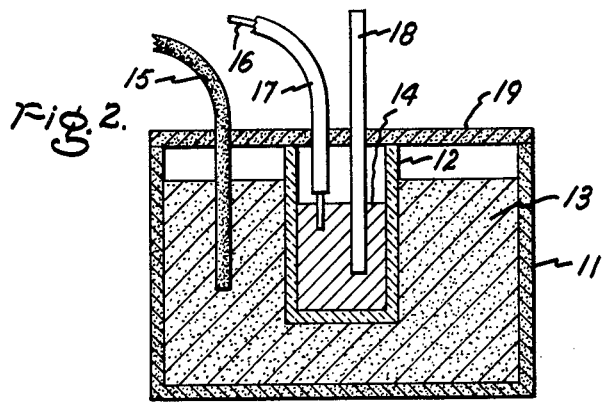
FIGURE 2 is a sectional view of a modified high temperature fuel cell.

In FIGURE 2, a modified high temperature fuel cell is shown which is identical with the cell shown in FIGURE 1 with the exception that an alumina or a carbon cover 19 closes container 11. A port, valve, or line (not shown) is provided to remove carbon monoxide during cell operation from electrode 13. The closed cell is advantageous in that it is leakproof.

We discovered that an efficient, stable fuel cell could be constructed and operated in the temperature range of 1000° C. to 1200° C. to provide a low voltage direct current power source. We found that a preferred cathode was silver to which an oxidant was supplied during cell operation. Our development disclosed further that a metallic, carbon solvent electrode provided an anode for the cell. Of the materials tested, we found that the group consisting of iron saturated with carbon and cobalt-tin saturated with carbon produced a satisfactory anode. The electrodes were an iron carbon eutectic alloy which contained 4.3 weight percent carbon and a cobalt-tin eutectic alloy which was saturated with carbon. We tested also nickel-manganese, nickel-copper, and chromium-antimony, all saturated with carbon. These materials did not appear as suitable for use in such a fuel cell. Both cell electrodes are characterized by being in liquid state during cell operation at high temperatures. We found that a carbon lead could be inserted into the anode while a stainless steel lead could be inserted in the silver electrode. An alumina, zirconia or stainless steel tube inserted in the silver electrode provided oxygen or air to the silver in molten state during cell operation.

Solid, "stabilized" zirconia is an oxygen ion transport medium which can be used as the electrolyte in such a high temperature fuel cell. "Stabilized" zirconia is a compound with a cubic crystal structure consisting of zirconia to which is added calcium oxide, yttrium oxide, or mixed rare earth oxides. Substantially pure zirconia, that is a compound with a monoclinic structure which is not "stabilized" by the addition of the above oxides, experiences volume changes when cycled thermally with resultant shattering of the material. Furthermore, substantially pure zirconia is not a low resistance ionic conductor. "Stabilized" zirconia is resistant to large volume changes upon thermally cycling and hence is mechanically stable. Additionally, "stabilized" zirconia serves as an oxygen ion transport medium by virtue of the anion vacancies generated in the zirconia structure upon cationic substitution of calcium, yttrium or rare earth metals for zirconium.

Each substitution of a divalent calcium ion for a tetravalent zirconium ion results in a charge unbalance in the crystal that is redressed by the absence of a divalent oxygen ion from a normally occupied anion site in the lattice. The concentration of vacancies is thus equal to the concentration of calcium ions in the zirconia. Since the movement of an oxygen ion vacancy through the lattice is the converse of an oxygen ion movement in the opposite direction, a relatively high degree of oxygen mobility can be realized at fuel cell operating temperatures where the ion-vacancy interchange occurs readily. A flux of oxygen through the stabilized zirconia lattice is effected by the establishment of an electric field resulting from the chemical potential difference for oxygen existing across the crystal. The relatively good conductivity, coupled with chemical stability and strength of the stabilized zirconia provides a very satisfactory electrolyte for high temperature fuel cells.

Figure 3:
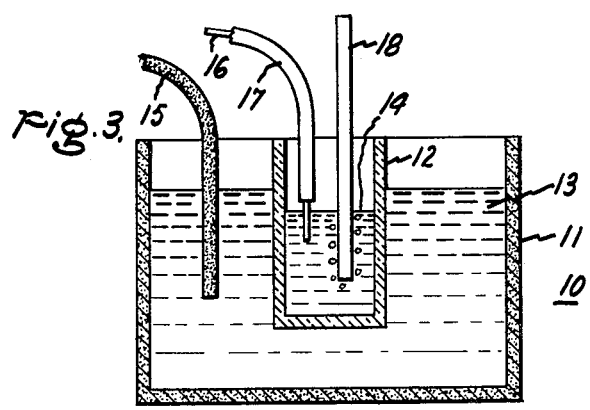
FIGURE 3 is a sectional view of the fuel cell of FIGURE 1 in operation.

In FIGURE 3 of the drawing, the operation of fuel cell 10 in FIGURE 1 is shown. The operation of the fuel cell in FIGURE 2 is identical in operation. Heat, such as waste heat, is supplied from a source (not shown) to raise the temperature of electrodes 13 and 14 of cell 10 in the range of 1000° C. to 1200° C. The molten silver cathode is then saturated with oxygen by bubbling air or oxygen through tube 18 into liquid electrode 14. The reaction at the cathode-electrolyte interface is as follows:

(1)  $O + 2e \rightarrow O^=$

The oxygen ion moves through electrolyte 12 to combine with carbon in accordance with the following reaction at the anode-electrolyte interface:

(2)  $C + O^= \rightarrow CO + 2e$

The electrons, which are given up at the anode are conducted through lead 15 to the apparatus (not shown) being operated while the oxygen at the cathode combines with the returning electrons. Carbon is added to anode 13 to provide carbon saturation thereof. The carbon monoxide which is generated at the anode can be released to the atmosphere, used to provide further heat for cell 10, or fed to a fuel cell employing carbon monoxide as a fuel. In the fuel cell shown in FIGURE 2, the carbon monoxide is released through a port, valve or line (not shown) and utilized in the same manner as in the fuel cell of FIGURE 1.

Figure 4:
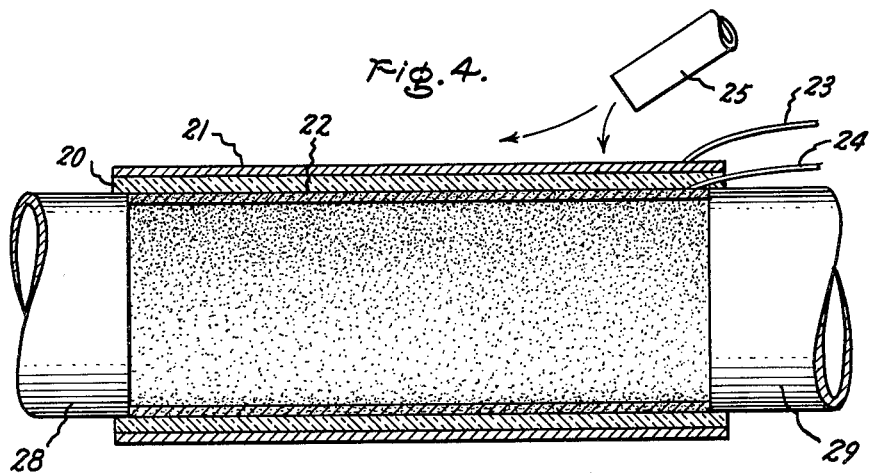
FIGURE 4 is a sectional view of another modified high temperature fuel cell.

In FIGURE 4, another modified high temperature fuel cell is shown which comprises a solid stabilized zirconia electrolyte 20 in the form of a hollow tubular member, a silver electrode 21 in direct contact with the exterior surface of member 20, and an electrode 22 selected from the group consisting of iron saturated with carbon and cobalt-tin saturated with carbon in direct contact with the interior surface of member 20. The electrodes can be reversed with the silver electrode in direct contact with the interior surface of member 20 while the other electrode is in direct contact with the exterior surface thereof. A lead 23 is attached to silver electrode 21 while a lead 24 is attached to the other electrode. The free ends of the leads are connected to apparatus (not shown) being operated by the cell. Means are provided for supplying a gaseous oxidant in the form of air or oxygen to silver electrode 21. For example, a tube 25 connected to an oxidant supply (not shown) supplies oxidant to electrode 21. Carbon fuel is supplied to the electrode selected from the group consisting of iron saturated with carbon and cobalt-tin saturated with carbon. For example, an inlet line 28 sprays a finely divided carbonaceous material in an inert gas such as nitrogen through the cell to deposit the carbon on electrode 22. An outlet line 29 removes the carbon monoxide formed at electrode 22 and the nitrogen.

Figure 5:
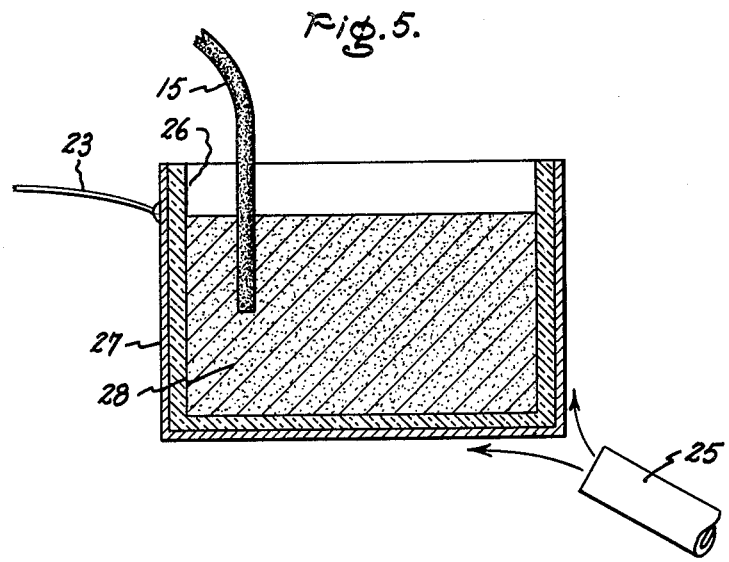
FIGURE 5 is a sectional view of a further modified high temperature fuel cell.

In FIGURE 5, a further modified high temperature fuel cell is shown which comprises a solid stabilized zirconia electrolyte in the form of a container 26, a silver electrode 27 in direct contact with the exterior surface of container 26, and an electrode 28 selected from the group consisting of iron saturated with carbon and cobalt-tin saturated with carbon positioned within the container 26. A lead 15 such as of carbon contacts electrode 28 by being inserted therein while a lead 23 is attached to silver electrode 27. The free ends of these leads are also connected to appropriate apparatus (not shown). Carbon saturation of anode 28 is maintained for example by dissolving partially carbon lead 15 while the lead provides electrical contact thereto. A tube 25 connected to an oxidant supply (not shown) supplies oxidant to electrode 27.

In the operation of the fuel cell in FIGURE 4, heat, such as waste heat, is supplied from a source (not shown) to raise the temperature of electrodes 21 and 22 in the range of 1000° C. to 1200° C. The silver electrode is saturated with oxygen which is supplied from tube 25. Carbon fuel is supplied to electrode 22 through inlet line 28 while carbon monoxide and nitrogen are removed through outlet line 29. Reactions 1 and 2 apply to the operation of this cell.

The operation of the fuel cell in FIGURE 5 is generally similar to the operation of cell 10 in FIGURE 1. However, silver electrode 27 is saturated with oxygen which is supplied from tube 25. Reactions 1 and 2 apply also to the operation of this cell.

A plurality of high temperature fuel cells were made in accordance with the present invention. In Table I, in which these cells are identified by cell numbers 1 through 19, there is set forth for each cell its anode material, operating temperature, load voltage in volts, current density in milliamperes, and operating time. During operation, each cell consisted of a liquid iron saturated with carbon anode or a liquid cobalt-tin saturated with carbon anode as set forth in Table I, an oxygen-saturated liquid silver cathode, and a solid stabilized zirconia electrolyte positioned between and in direct contact with the electrodes. Oxygen saturation of the cathode was achieved by bubbling oxygen through an alumina or stainless steel tube into the liquid silver. The anode was positioned in a first container of alumina or carbon while a second container of stabilized zirconia, the solid electrolyte, was positioned in the first container. The anode was in direct contact with both containers. The cathode was positioned in the second container. Electrical leads were connected to both electrodes and power generated by the cell was dissipated in a simple decade resistor. Carbon was added to the anode by dissolving partially its carbon lead. Each cell was heated to its operating temperature in a resistance furnace.

Table I

| Cell No. | Anode | Temp., °C. | Load Voltage (v.) | Current Density (ma./cm.²) | Time (Hours) |
|---|---|---|---|---|---|
| 1 | Fe–C | 1,200 | .6 | 2.0 | 72.0 |
| 2 | Fe–C | 1,171 | .43 | 15.0 | 72.0 |
| 3 | Fe–C | 1,187 | .26 | 9.2 | 2.0 |
| 4 | Fe–C | 1,165 | .96 | 1.0 | 588.0 |
| 5 | Fe–C | 1,180 | .59 | 18.0 | 4.0 |
| 6 | Fe–C | 1,165 | .75 | 10.0 | 3.0 |
| 7 | Fe–C | 1,200 | .80 | 2.0 | 15.0 |
| 8 | Fe–C | 1,170 | .60 | 20.0 | 1.5 |
| 9 | Fe–C | 1,170 | .7 | 6.0 | 7.0 |
| 10 | Fe–C | 1,170 | .65 | 40.0 | 0.75 |
| 11 | Fe–C | 1,170 | .64 | 80.0 | 0.33 |
| 12 | Fe–C | 1,160 | .73 | 10.0 | 11.0 |
| 13 | Fe–C | 1,170 | .70 | 40.0 | 1.5 |
| 14 | Fe–C | 1,170 | .70 | 40.0 | 3.0 |
| 15 | Fe–C | 1,170 | .75 | 40.0 | 6.0 |
| 16 | Fe–C | 1,170 | .75 | 40.0 | 4.5 |
| 17 | Fe–C | 1,190 | .78 | 5.0 | 10.0 |
| 18 | Fe–C | 1,190 | .74 | 7.0 | 20.0 |
| 19 | SnCo–C | 1,160 | .68 | 8.0 | 340.0 |

While other modifications of this invention and variations thereof which may be employed within the scope of the invention have not been described, the invention is intended to include such that may be embraced within the following claims.

What we claim as new and desire to secure by Letters Patent of the United States is:

1. In a fuel cell including an anode, the combination of a solid stabilized zirconia electrolyte, a silver cathode in direct contact with one surface of said electrolyte, said cathode characterized by being in liquid state during cell operation, and means for supplying a gaseous oxidant containing molecular oxygen to said silver cathode.

2. A fuel cell comprising a silver electrode, a second electrode selected from the group consisting of iron saturated with carbon and cobalt-tin saturated with carbon, said electrodes characterized by being in liquid state during cell operation at temperatures in the range of 1000° C. to 1200° C., a solid stabilized zirconia electrolyte positioned between and in direct contact with said electrodes, means for supplying a gaseous oxidant containing molecular oxygen to said silver electrode, means for supplying a carbon fuel to said second electrode, and means for excluding molecular oxygen from said second electrode during cell operation.

3. A fuel cell comprising a silver electrode, a second electrode selected from the group consisting of iron saturated with carbon and cobalt-tin saturated with carbon, said electrodes characterized by being in liquid state during cell operation at temperatures in the range of 1000° C. to 1200° C., a solid stabilized zirconia electrolyte positioned between and in direct contact with said electrodes, means for supplying a gaseous oxidant containing molecular oxygen to said silver electrode, said means comprising a tube inserted in said silver electrode, means for supplying a carbon fuel to said second electrode, and means for excluding molecular oxygen from said second electrode during cell operation.

4. A fuel cell comprising a container, a silver electrode in said container, a second electrode selected from the group consisting of iron saturated with carbon and cobalt-tin saturated with carbon within said container, said electrodes characterized by being in liquid state during cell operation at temperatures in the range of 1000° C. to 1200° C., a solid stabilized zirconia electrolyte positioned between and in direct contact with said electrodes, means for supplying a gaseous oxidant containing molecular oxygen to said silver electrode, means for supplying a carbon fuel to said second electrode, and means for excluding molecular oxygen from said second electrode during cell operation.

5. A fuel cell comprising a first container, a second container consisting of solid stabilized zirconia positioned within said first container, a silver electrode, a second electrode selected from the group consisting of iron saturated with carbon and cobalt-tin saturated with carbon, said electrodes characterized by being in liquid state during cell operation at temperatures in the range of 1000° C. to 1200° C., one of said electrodes positioned in said first container and in direct contact with said second container, and the other of said electrodes in said second container, means for supplying a gaseous oxidant containing molecular oxygen to said silver electrode, means for supplying a carbon fuel to said second electrode, and means for excluding molecular oxygen from said second electrode during cell operation.

6. A fuel cell comprising a closed first container, a second container consisting of solid stabilized zirconia positioned within said first container, a silver electrode, a second electrode selected from the group consisting of iron saturated with carbon and cobalt-tin saturated with carbon, said electrodes characterized by being in liquid state during cell operation at temperatures in the range of 1000° C. to 1200° C., one of said electrodes positioned in said first container and in direct contact with said second container, and the other of said electrodes in said second container, means for supplying a gaseous oxidant containing molecular oxygen to said silver electrode, means for supplying a carbon fuel to said second electrode, and means for excluding molecular oxygen from said second electrode during cell operation.

7. A fuel cell comprising a first container, a second container consisting of solid stabilized zirconia positioned within said first container, a silver electrode, an electrical lead contacting said silver electrode, a second electrode selected from the group consisting of iron saturated with carbon and cobalt-tin saturated with carbon, an electrical lead contacting said second electrode, said electrodes characterized by being in liquid state during cell operation at temperatures in the range of 1000° C. to 1200° C., one of said electrodes positioned in said first container and in direct contact with said second container, and the other of said electrodes in said second container, means for supplying a gaseous oxidant containing molecular oxygen to said silver electrode, means for supplying a carbon fuel to said second electrode, and means for excluding molecular oxygen from said second electrode during cell operation.

8. A fuel cell comprising a first container, a second container consisting of solid stabilized zirconia positioned within said first container, a silver electrode, a stainless steel lead contacting said silver electrode, a second electrolyte selected from the group consisting of iron saturated with carbon and cobalt-tin saturated with carbon, a carbon lead contacting said second electrode, said electrodes characterized by being in liquid state during cell operation at temperatures in the range of 1000° C. to 1200° C., one of said electrodes positioned in said first container and in direct contact with said second container, and the other of said electrodes in said second container, means for supplying a gaseous oxidant containing molecular oxygen to said silver electrode, and means for excluding molecular oxygen from said second electrode during cell operation.

9. A fuel cell comprising a container consisting of solid, stabilized zirconia, an electrode selected from the group consisting of iron saturated with carbon and cobalt-tin saturated with carbon within said container, a silver electrode in direct contact with the exterior surface of said container, said electrodes characterized by being in liquid state during cell operation at temperatures in the range of 1000° C. to 1200° C., means for supplying a carbon fuel to said first electrode, means for excluding molecular oxygen from said first electrode during cell operation, and means for supplying a gaseous oxidant containing molecular oxygen to said silver electrode.

10. A fuel cell comprising a container consisting of solid stabilized zirconia, an electrode selected from the group consisting of iron saturated with carbon and cobalt-tin saturated with carbon within said container, a silver electrode in direct contact with the exterior surface of said container, said electrodes characterized by being in liquid state during cell operation at temperatures in the range of 1000° C. to 1200° C., an electrical lead contacting said first electrode, an electrical lead contacting said silver electrode, means for excluding molecular oxygen from said first electrode during cell operation, means for supplying a carbon fuel to said first electrode, and means for supplying a gaseous oxidant containing molecular oxygen to said silver electrode.

11. A fuel cell comprising a hollow member consisting of solid stabilized zirconia, a silver electrode in direct contact with a surface of said member, a second electrode selected from the group consisting of iron saturated with carbon and cobalt-tin saturated with carbon in direct contact with the opposite surface of said member, said electrodes characterized by being in liquid state during cell operation at temperatures in the range of 1000° C. to 1200° C., means for supplying a gaseous oxidant containing molecular oxygen to said silver electrode, means for supplying a carbon fuel to said second electrode, and means for excluding molecular oxygen from said second electrode during cell operation.

12. A fuel cell comprising a hollow member consisting of solid stabilized zirconia, a silver electrode in direct contact with the exterior surface of said member, and electrical lead contacting said silver electrode, a second electrode selected from the group consisting of iron saturated with carbon and cobalt-tin saturated with carbon in direct contact with the interior surface of said member, an electrical lead contacting said second electrode, said electrodes characterized by being in liquid state during cell operation at temperatures in the range of 1000° C. to 1200° C., means for supplying a gaseous oxidant containing molecular oxygen to said silver electrode, means for supplying a carbon fuel to said second electrode, and means for excluding molecular oxygen from said second electrode during cell operation.

13. In a fuel cell, in combination, a molten silver cathode, a molten anode selected from the group consisting of iron saturated with carbon and cobalt-tin saturated with carbon, and a solid stabilized zirconia electrolyte disposed between and contacting opposed portions of said cathode and said anode.

References Cited in the file of this patent

UNITED STATES PATENTS

| | | |
|---|---|---|
| 569,591 | Short | Oct. 13, 1896 |
| 2,830,109 | Justi et al. | Apr. 8, 1958 |
| 2,914,596 | Gorin et al. | Nov. 24, 1959 |

OTHER REFERENCES

Journal of the Electrochemical Soc., vol. 104, June 1957, pages 379–386.